United States Patent
Kajikawa et al.

(10) Patent No.: US 10,884,737 B2
(45) Date of Patent: Jan. 5, 2021

(54) IMAGE PROCESSING DEVICE AND IMAGE PROCESSING METHOD

(71) Applicant: BROTHER KOGYO KABUSHIKI KAISHA, Nagoya (JP)

(72) Inventors: Yoshifumi Kajikawa, Nagoya (JP); Tomohiko Hasegawa, Okazaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 73 days.

(21) Appl. No.: 16/391,484

(22) Filed: Apr. 23, 2019

(65) Prior Publication Data
US 2019/0332377 A1    Oct. 31, 2019

(30) Foreign Application Priority Data

Apr. 27, 2018 (JP) ................................ 2018-086273

(51) Int. Cl.
*G06F 9/30* (2018.01)
*G06K 7/14* (2006.01)
*G06K 9/20* (2006.01)

(52) U.S. Cl.
CPC ......... *G06F 9/3004* (2013.01); *G06K 7/1434* (2013.01); *G06K 9/2063* (2013.01)

(58) Field of Classification Search
CPC ........... G06Q 20/3276; G06Q 30/0643; G06K 9/00201; G06K 9/3208; G06K 7/10821
See application file for complete search history.

(56) References Cited

U.S. PATENT DOCUMENTS

| 7,845,560 B2* | 12/2010 | Emanuel | B66F 9/0755 |
| | | | 235/462.08 |
| 8,561,897 B2* | 10/2013 | Kunzig | G06T 7/73 |
| | | | 235/385 |
| 8,983,231 B2* | 3/2015 | Sagan | G07D 7/2008 |
| | | | 382/286 |
| 9,092,770 B2* | 7/2015 | McCauley | G06Q 20/401 |
| 9,262,741 B1* | 2/2016 | Williams | G06Q 20/26 |
| 9,424,470 B1* | 8/2016 | Hinterstoisser | B25J 9/0093 |
| 9,659,204 B2* | 5/2017 | Wu | G06K 7/1443 |

FOREIGN PATENT DOCUMENTS

| JP | H06-103399 A | 4/1994 |
| JP | 2014-016921 A | 1/2014 |

* cited by examiner

*Primary Examiner* — Yosef Kassa
(74) *Attorney, Agent, or Firm* — Scully, Scott, Murphy & Presser, PC

(57) ABSTRACT

An image processing device includes: a controller; and memory storing instructions that, when executed by the controller, cause the controller to perform operations including: acquiring target image data, in which a target image based on the target image data includes a plurality of partial images including a barcode; specifying the barcode in the target image; deciding a first direction being a direction perpendicular to bars making at least one specified barcode; specifying a blank range where the partial image is not positioned in the first direction and an object range where the partial image is positioned in the first direction; separating the target image to one or more separated target images in accordance with the specified blank range and the specified object range, the separated target image including the object range and excluding the blank range; and outputting image data corresponding to the separated target images.

12 Claims, 10 Drawing Sheets

IMAGE PROCESSING DEVICE AND IMAGE PROCESSING METHOD

CROSS-REFERENCE TO RELATED APPLICATION

This application claims priority from Japanese Patent Application No. 2018-086273 filed on Apr. 27, 2018 the entire subject matter of which is incorporated herein by reference.

TECHNICAL FIELD

The present invention relates to image processing for an image including a barcode.

BACKGROUND

In the background art, a horizontal histogram and a vertical histogram which are obtained by accumulating the values of pixels within a barcode region in a horizontal direction and a vertical direction are used when a barcode is read and decoded.

SUMMARY

However, the above-described technique is merely a technique to specify a barcode region included in an image and is not used to specify an object range formed by a barcode and an image other than the barcode.

This specification discloses a technique which can suppress an extra blank from being included and appropriately output a partial image including a barcode.

The technique disclosed in this specification is contrived to solve at least some of the above-described problems, and can be implemented as the following application examples.

An image processing device of one example of this disclosure includes a controller; and memory storing instructions that, when executed by the controller, cause the controller to perform operations including: acquiring target image data, in which a target image based on the target image data includes a plurality of partial images including a barcode; specifying the barcode in the target image; deciding a first direction being a direction perpendicular to bars making at least one specified barcode; specifying a blank range where the partial image is not positioned in the first direction and an object range where the partial image is positioned in the first direction; separating the target image to one or more separated target images in accordance with the specified blank range and the specified object range, the separated target image including the object range and excluding the blank range; and outputting image data corresponding to the separated target images.

According to the above-described configuration, an object range in which an object excluding a blank range, in which an object is not positioned, is positioned is specified with respect to a plurality of positions in a first direction perpendicular to bars making a barcode. As a result, an object range is specified with respect to a plurality of positions in a direction perpendicular to bars making a barcode, and thus it is possible to avoid the separation of a partial image due to a blank present between an image to be treated as one piece of image data and the barcode. In addition, since image data corresponding to an image within a first object range is output, the image data appropriately indicating a partial image including the barcode can be output so as not to include a residual blank.

The technique disclosed in this specification can be implemented in various forms, for example, a printing device, a printing method, an image processing method, a computer program for implementing functions of these devices or the above-described method, and a recording medium having the computer program recorded thereon, and the like.

BRIEF DESCRIPTION OF THE DRAWINGS

The foregoing and additional features and characteristics of this disclosure will become more apparent from the following detailed descriptions considered with the reference to the accompanying drawings, wherein:

FIGS. 11A to 11C are diagrams illustrating a barcode label reduction process.

DETAILED DESCRIPTION

A. Example:
A-1: Configuration of Image Processing Device

Figure 1:
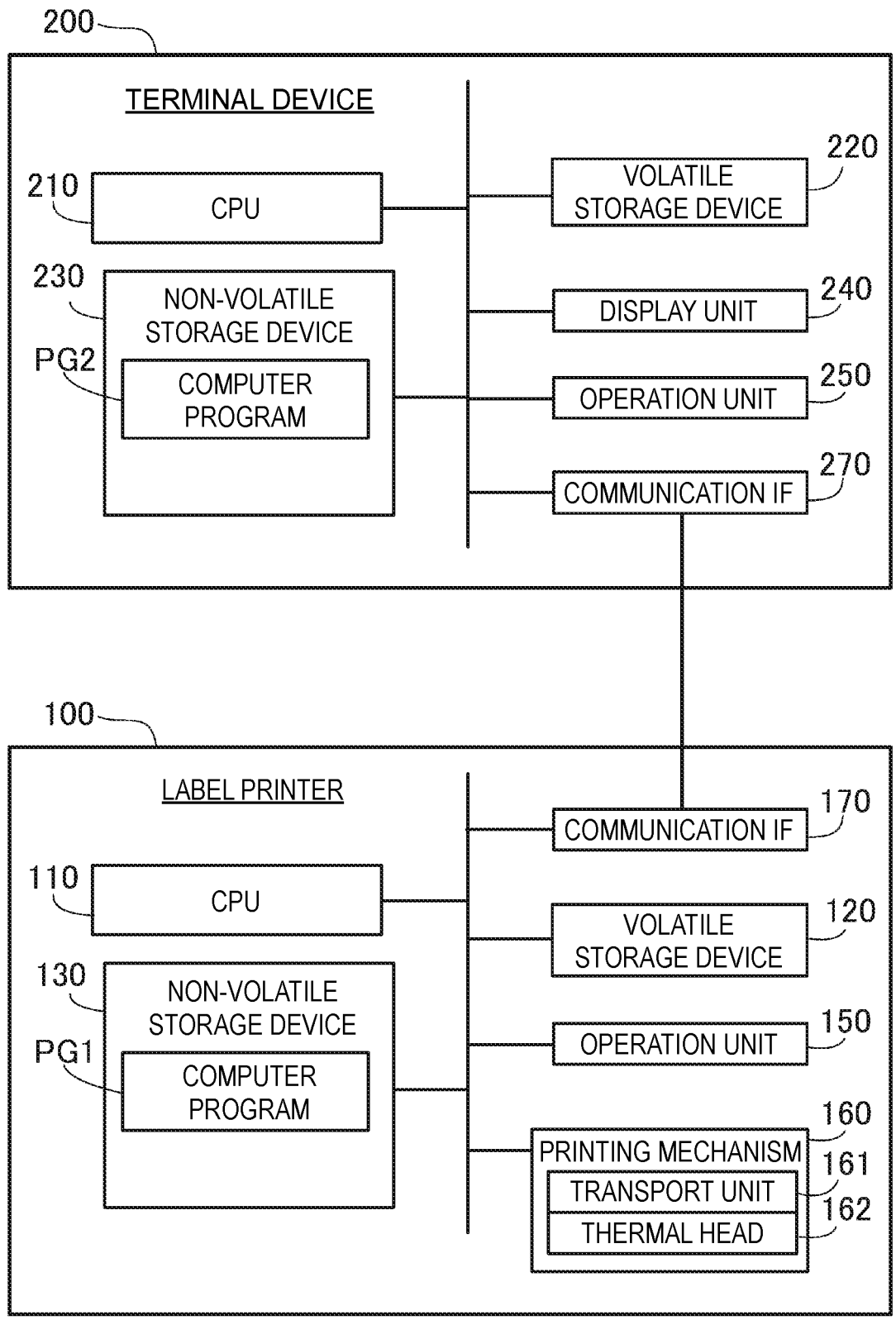
FIG. 1 is a block diagram illustrating configurations of a label printer 100 and a terminal device 200.

Next, an embodiment will be described based on an example. FIG. 1 is a block diagram illustrating configurations of a label printer 100 as a printing execution unit in the example and a terminal device 200 as an image processing device in the example.

The terminal device 200 is a computer used by a user and is, for example, a personal computer or a smartphone. The terminal device 200 includes a CPU 210 as a controller of the terminal device 200, a volatile storage device 220 such as a RAM, a non-volatile storage device 230 such as a hard disk drive or a flash memory, a display unit 240 such as a liquid crystal display, an operation unit 250 such as a keyboard or a mouse, and a communication interface (IF) 270. The terminal device 200 is communicably connected to an external device such as the label printer 100 through the communication interface 270. The communication interface 270 is a wired interface such as a USB interface or a wireless interface such as Bluetooth (registered trademark) or IEEE802.11.

The volatile storage device 220 provides a buffer region for temporarily storing various intermediate data generated when the CPU 210 performs processing. A computer program PG2 is stored in the non-volatile storage device 230. The volatile storage device 220 and the non-volatile storage device 230 are internal memories of the terminal device 200.

The computer program PG2 is provided in the form of being downloaded from a server connected through the Internet. Alternatively, the computer program PG2 can be provided, for example, in the form of being recorded in a CD-ROM or the like or in the form of being stored in the non-volatile storage device 230 in advance at the time of manufacturing the terminal device 200. The CPU 210 executes a label printing process to be described later by executing the computer program PG2.

The label printer 100 is a printing device that prints an image on a sheet for a label to be bonded to a commodity. The label printer 100 includes a CPU 110 as a controller of the label printer 100, a volatile storage device 120 such as a RAM, a non-volatile storage device 130 such as a flash memory, an operation unit 150 such as a plurality of buttons, a printing mechanism 160, and a communication interface (IF) 170. The label printer 100 is communicably connected to an external device such as the terminal device 200 through the communication interface 170. The communication interface 170 is a wired interface such as a USB interface or a wireless interface such as Bluetooth (registered trademark) or IEEE802.11.

The volatile storage device 120 provides a buffer region for temporarily storing various intermediate data generated when the CPU 110 performs processing. A computer program PG1 is stored in the non-volatile storage device 130. The volatile storage device 120 and the non-volatile storage device 130 are memories provided inside the label printer 100. The computer program PG1 is provided in the form of being stored in the non-volatile storage device 130 in advance at the time of manufacturing the label printer 100. Alternatively, the computer program PG1 may be provided in the form of being downloaded from a server connected through the Internet or in the form of being transmitted from the terminal device 200. The CPU 210 prints an image on a sheet for a label in accordance with, for example, printing image data transmitted from the terminal device 200 by executing the computer program PG1.

Figure 2A:
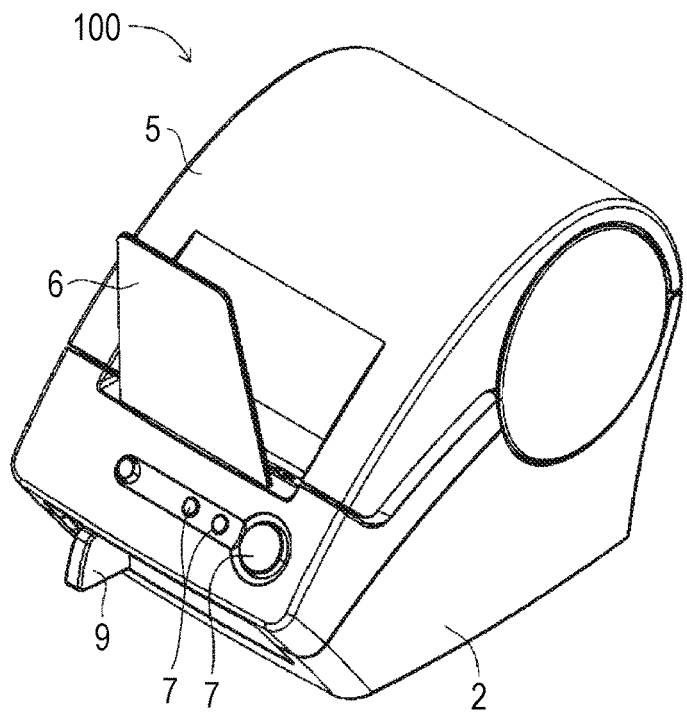
FIGS. 2A and 2B are perspective views of the label printer 100.
Figure 2B:
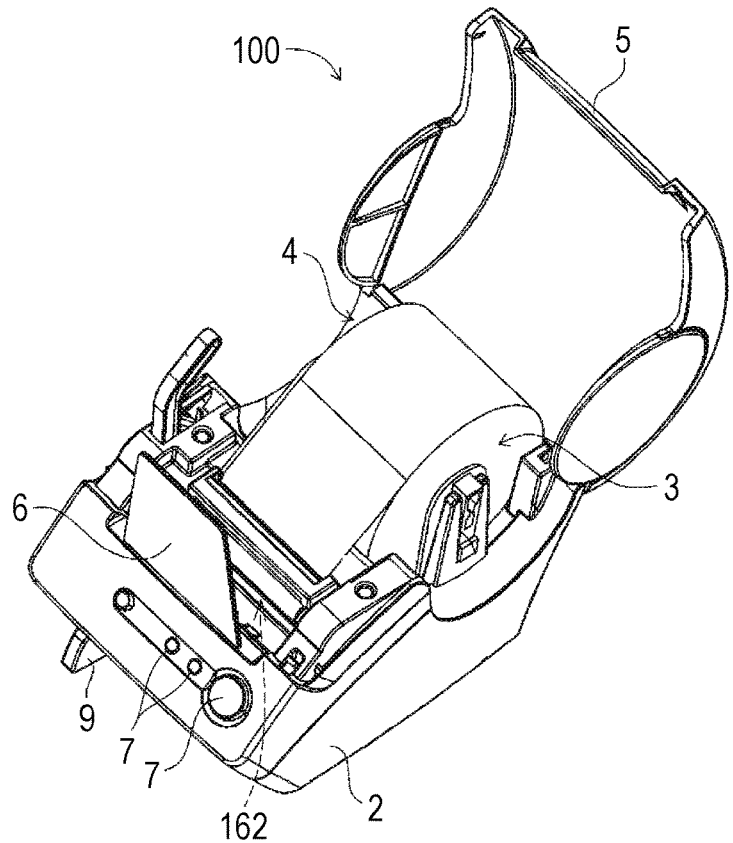

FIGS. 2A and 2B are perspective views of the label printer 100. The perspective view of FIG. 2A illustrates the external appearance of the label printer 100 in a state where a cover 5 is closed, and the perspective view of FIG. 2B illustrates the external appearance of the label printer 100 in a state where the cover 5 is opened. As illustrated in FIG. 2A, a housing 2 of the label printer 100 is provided with the cover 5 attached to be openable and closable upward, a tray 6 provided at the front part thereof, a plurality of buttons 7 making the operation unit 150 mentioned above, and a cutter lever 9 for operating a cutter (not shown) cutting a roller 3 (FIG. 2B).

As illustrated in FIG. 2B, a sheet accommodating unit 4 accommodating the roller 3 wound by a sheet for a label is formed inside the housing 2. The sheet for a label is a belt-like sheet in which release paper is bonded to one side of a sheet main body made by a thermosensitive sheet through an adhesive layer to be attached to a commodity. After a label image is printed on the sheet for a label, a portion having the label image printed thereon in the sheet for a label is separated from the roller 3 by the cutter. In addition, the release paper is separated from the sheet main body on which the label image is printed, and the sheet main body having the label image printed thereon is bonded to a commodity through the adhesive layer.

The printing mechanism 160 of FIG. 1 includes a transport unit 161 and a thermal head 162 as a printing head, and prints a monochrome image on a sheet for a label for forming the roller 3. The transport unit 161 includes a step motor and a roller, which are not shown in the drawing, and sends out a sheet for a label toward the tray 6 from the roller 3 to transport the sheet for a label. The thermal head 162 is provided at a transport path of a sheet, and includes a plurality of (for example, several hundreds) heating elements (not shown) which are arranged along a direction perpendicular to a transport direction of the sheet. The thermal head 162 forms dots on a sheet by heating a position on the sheet where the dots are to be formed by using a heating element under the control of the CPU 110.

A-2: Label Printing Process

Figure 3:
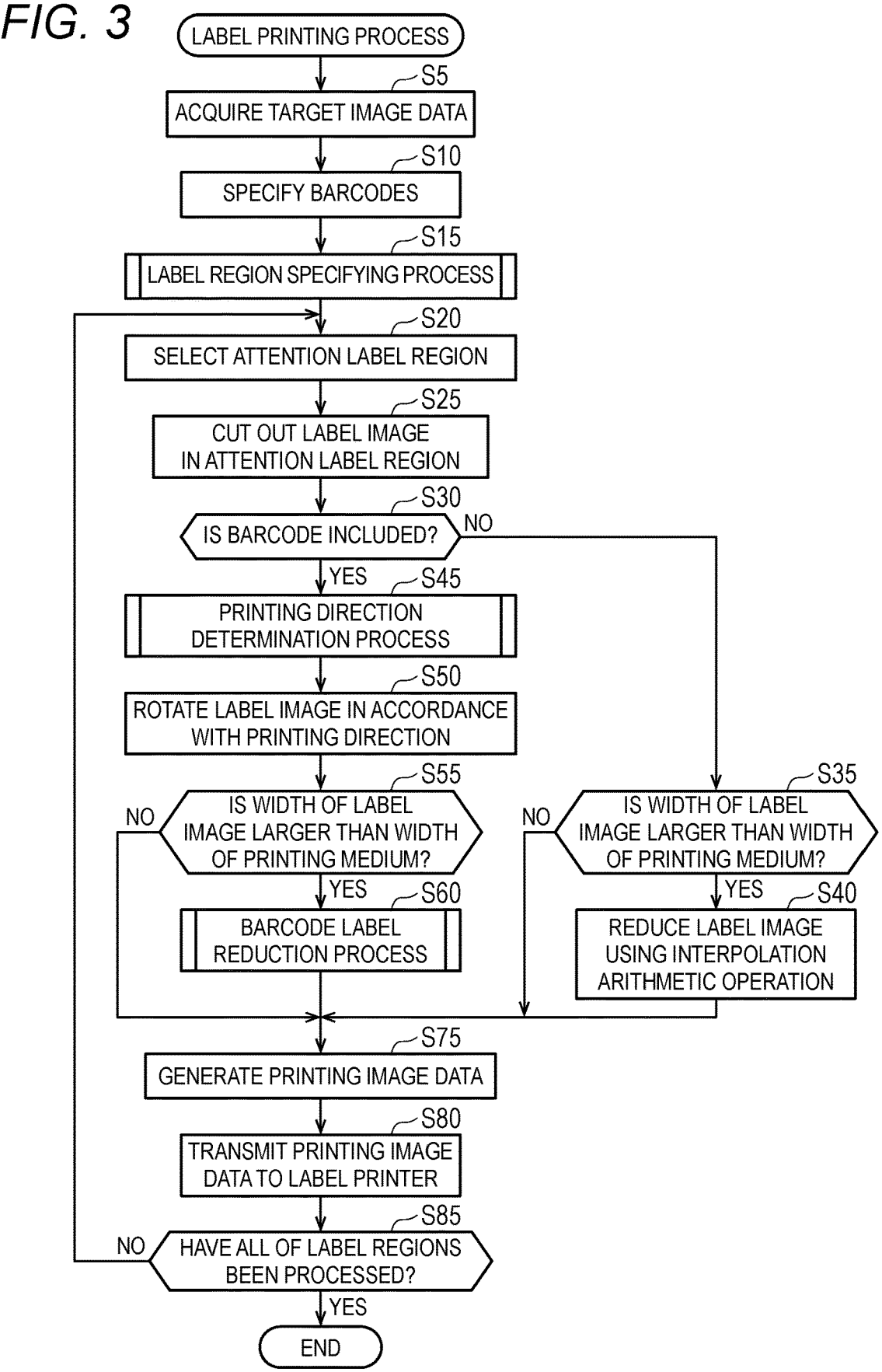
FIG. 3 is a flow chart of a label printing process.

FIG. 3 is a flow chart of a label printing process. The label printing process is a process of printing a label image on the label printer 100 using target image data. The label printing process is executed by the CPU 210 of the terminal device 200. The label printing process is started when the terminal device 200 acquires a printing instruction given by a user, for example, through the operation unit 250.

In S5, the CPU 210 acquires target image data indicating a target image OI to be printed. The target image data is image data selected based on a user's designation from a plurality of pieces of image data stored in, for example, the non-volatile storage device 230.

The target image data acquired in the present example includes values of a plurality of pixels, and each of the values of the plurality of pixels is luminance image data indicating the luminance of a pixel. The luminance of one pixel is indicated by, for example, a value of 256 gradations. Meanwhile, when the acquired target image data is not luminance image data, the target image data is converted into luminance image data, for example, by executing conversion processing such as rasterization processing on the target image data.

Figure 4:
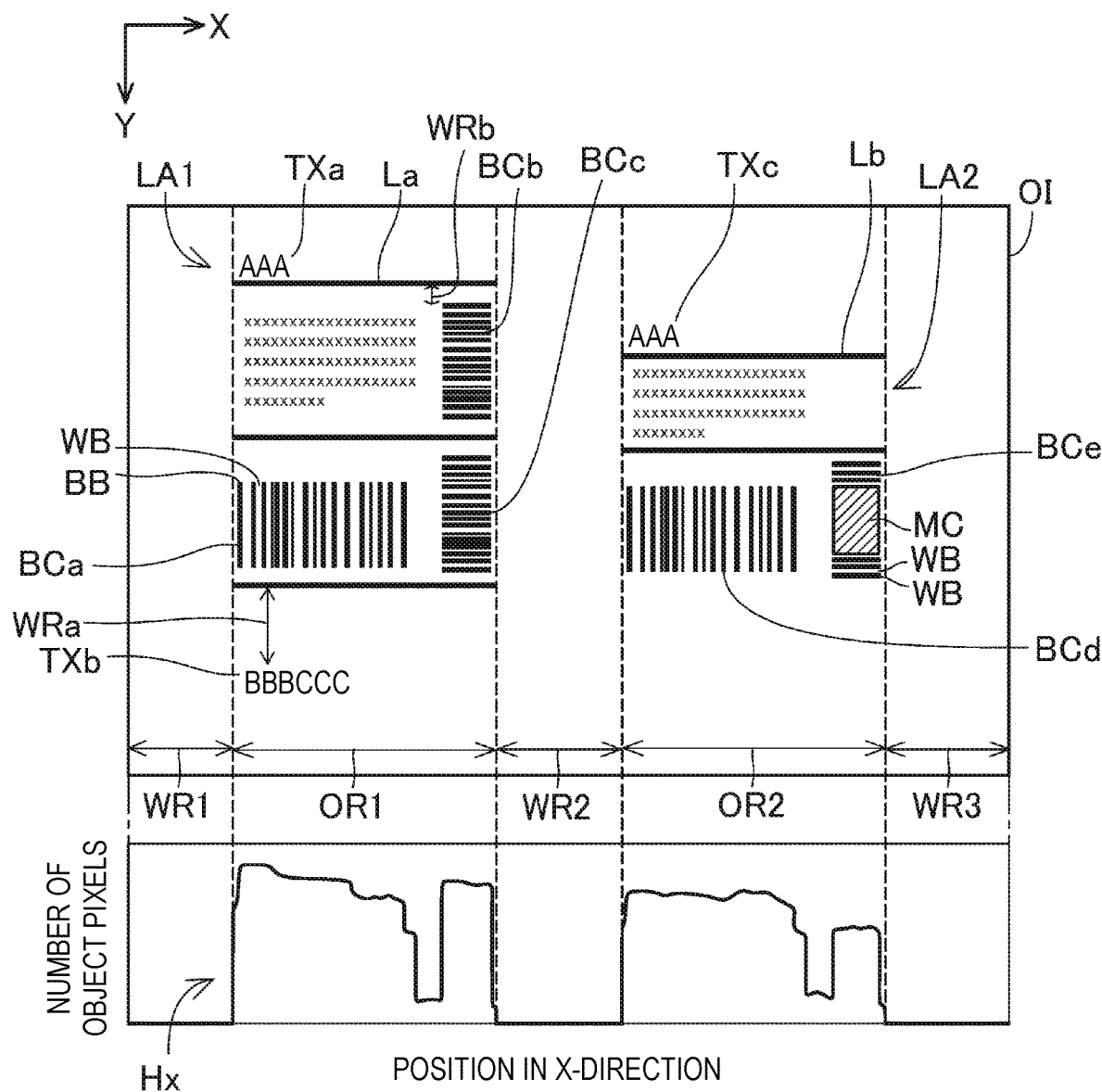
FIG. 4 is a diagram illustrating an example of a target image.

FIG. 4 is a diagram illustrating an example of a target image. A target image OI of FIG. 4 includes a plurality of pixels arranged in a matrix along an X-direction (a horizontal direction in FIG. 4) and a Y-direction (a vertical direction in FIG. 4). The target image OI includes a first label region LA1 and a second label region LA2. An image in each label region is an image indicating one label and is an image to be printed as one body. An image in one label region (an object such as a barcode, a character, or a line to be described later) is also called a label image. The target image OI of the present example is an image indicating a label for delivering a product. For example, a label image in the first label region LA1 is an image indicating a label to be attached to a product, and a label image in a second label region LA2 is an image indicating a label to be attached to a package accommodating a product.

The first label region LA1 includes a plurality of barcodes BCa to BCc and objects different from the barcodes, such as characters TXa and TXb and a line La, as objects. The second label region LA2 includes a plurality of barcodes BCd and BCe and objects different from the barcodes, such as a character TXc and a line Lb, as objects.

The barcode is a code image including a plurality of white lines WB and a plurality of black lines BB arranged alternately and indicating information by patterns of the white lines WB and the black lines BB. The white lines WB and the black lines BB making the barcode are also called bars. A direction in which the bars making the barcode extend is also called a direction of the barcode. In the example of FIG. 4, the direction of the barcodes BCa and BCd is the Y-direction, and the direction of the barcodes BCb, BCc, and BCe is the X-direction. The barcode may include a two-dimensional code MC in addition to the white lines WB and the black lines BB, like the barcode BCe of FIG. 4.

The barcode is classified into a plurality of types according to standards such as the thicknesses and arrangement patters of the white lines WB and the black lines BB. For example, the types of barcodes include JAN, UPC, ITF, CODE39, CODE128, and the like. In the present example, the reading of a barcode called CODE128 is considered important. In the example of FIG. 4, the barcodes BCa and BCd are barcodes of CODE128, and the barcodes BCb, BCc, and BCe are barcodes of types different from CODE128.

In S10, the CPU 210 specifies one or more barcodes in the target image OI. The specification of the barcodes is performed using a known barcode specifying process which is executed in, for example, a normal barcode reading device. By this process, a region in which the barcodes are disposed and the direction of the barcodes are specified. The direction of the barcodes is any one of the X-direction and the Y-direction in the present example. In the example of FIG. 4, a region and a direction in which five barcodes BCa to BCe are disposed are specified.

In S15, the CPU 210 executes a label region specifying process using target image data. The label region specifying process is a process of specifying one or more label regions included in the target image OI. In the example of FIG. 4, two label regions in the target image OI, that is, the first label region LA1 and the second label region LA2 are specified. The label region specifying process will be described later.

In S20, the CPU 210 specifies one attention label region among one or more specified label regions. In S25, the CPU 210 cuts out a label image in the attention label region from the target image OI. That is, the CPU 210 extracts partial image data corresponding to a partial image within the attention label region in the target image OI as label image data, and stores the label image data in a buffer region of the volatile storage device 220 as separate data.

In S30, it is determined whether or not a barcode is included in an attention label region. When at least one of the barcodes specified in S10 is included in the attention label region, it is determined that a barcode is included in the attention label region. In the example of FIG. 4, even when any one of the first label region LA1 and the second label region LA2 is an attention label region, it is determined that a barcode is included in the attention label region.

When a barcode is not included in the attention label region (S30: NO), the CPU 210 determines whether or not the width of the label image in the X-direction is larger than the width of a printing medium in S35. The number of pixels of the label image in the X-direction can be converted into the length of a printed image using a resolution in a direction perpendicular to a transport direction of the label printer 100. When the converted value is larger than the width of the printing medium, that is, the width of the belt-like sheet for forming the roller 3 in the lateral direction, it is determined that the width of the label image in the X-direction is larger than the width of the printing medium.

When the width of the label image in the X-direction is larger than the width of the printing medium (S35: YES), the CPU 210 reduces the label image using an interpolation arithmetic operation in S40. Known arithmetic methods, for example, the bi-cubic method or the bi-linear method is used for the interpolation arithmetic operation. The number of pixels of the reduced label image in the X-direction is, for example, the number of pixels corresponding to the width of the printing medium. When a reduction method using an interpolation arithmetic operation is used, characters and lines in the reduced image have natural appearances, as compared with a case where a reduction method not using an interpolation arithmetic operation, for example, a known nearest neighbor method is used. When the width of the label image in the X-direction is equal to or less than the width of the printing medium (S35: NO), the CPU 210 skips S40.

Meanwhile, the processing of S35 is performed on the assumption that the printing direction is the Y-direction, but determination may be performed based on the width of the label image in the Y-direction in S35 when it is assumed that the printing direction is the X-direction.

When a barcode is included in the attention label region (S30: YES), the CPU 210 executes a printing direction determination process using label image data in S45. The printing direction determination process is a process of determining a printing direction when a label image in the attention label region is printed. The printing direction is a direction corresponding to a transport direction of a sheet for a label in the label printer 100, that is, a direction corresponding to a longitudinal direction of a belt-like sheet for forming the roller 3. In the present example, t printing direction is determined to be any one of the X-direction and the Y-direction of FIG. 4. The printing direction determination process will be described later.

In S50, the CPU 210 rotates the label image in accordance with the determined printing direction. Specifically, the label image is rotated so that the printing direction and the Y-direction of the rotated label image are consistent. Therefore, the label image is rotated clockwise or counterclockwise by 90 degrees when the printing direction is the X-direction, and the label image is not rotated when the printing direction is the Y-direction.

In S55, the CPU 210 determines whether or not the width of the label image in the X-direction is larger than the width of the printing medium. When the width of the label image in the X-direction is larger than the width of the printing medium (S55: YES), the CPU 210 executes a barcode label reduction process for reducing the label image including a barcode in S60. The barcode label reduction process will be described later. When the width of the label image in the X-direction is equal to or less than the width of the printing medium (S55: NO), the CPU 210 skips S60.

Figure 5A:
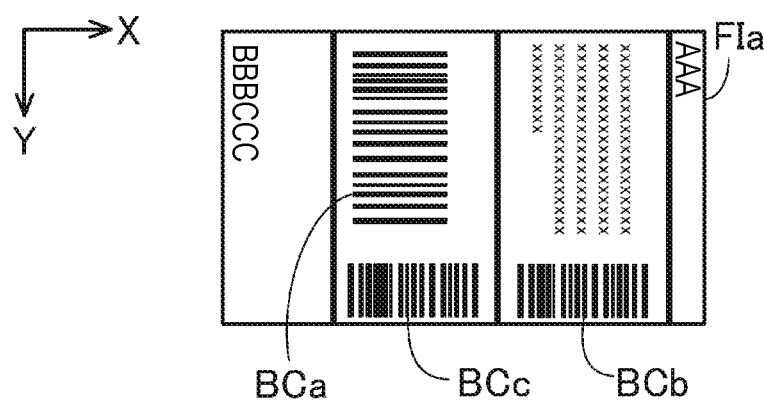
FIGS. 5A and 5B are diagrams illustrating examples of processed label images FIa and Fib.
Figure 5B:
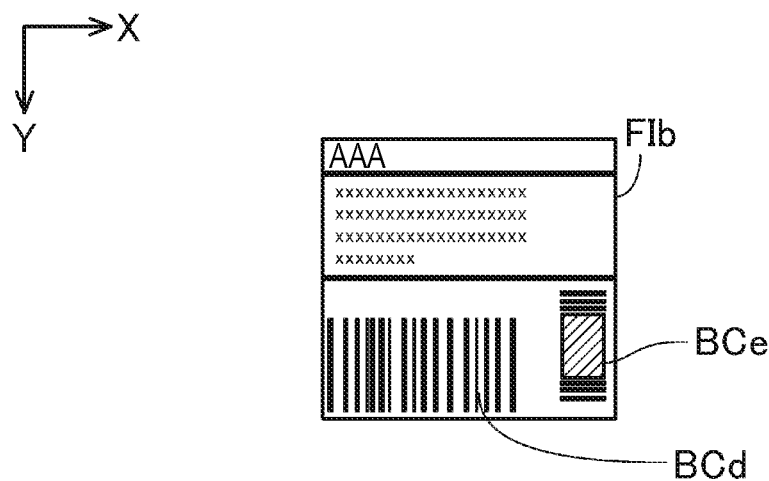

In S75, the CPU 210 generates printing image data for printing the label image by the label printer 100 using the processed label image data. FIGS. 5A and 5B are diagrams illustrating examples of processed label images FIa and FIb. The processed label image FIa in FIG. 5A is an image corresponding to the first label region LA1 in the target image OI. The processed label image FIa in FIG. 5A is rotated by 90 degrees in S50. The processed label image FIb in FIG. 5B is an image corresponding to the second label region LA2 in the target image OI. The processed label image FIb in FIG. 5B is not rotated in S50. The CPU 210 executes, for example, halftone processing on the processed label image data to generate dot data indicating the state of dots formed for each pixel. The halftone processing is executed using a known method such as an error diffusion method or a dither method. The value of a pixel of the dot data is, for example, a binary value indicating the presence or absence of a dot. The CPU 210 adds a control command for controlling the label printer 100, or the like to the dot data to generate printing image data.

In S80, the CPU 210 transmits the generated printing image data to the label printer 100. When the label printer 100 receives the printing image data, the CPU 110 of the label printer 100 controls the printing mechanism 160 based on the printing image data to cause the printing mechanism 160 to print a label image.

In S85, the CPU 210 determines whether or not all of the label regions in the target image OI have been processed as attention label regions. When there is an unprocessed label region (S85: NO), the CPU 210 returns to S20. When all of the label regions have been processed (S85: YES), the CPU 210 terminates the label printing process. As a result, label images corresponding to all of the label regions in the target image OI are printed by the label printer 100. For example, when the target image data in FIG. 4 is used, two processed label images FIa and FIb in FIG. 5 are printed respectively.

A-3. Label Region Specifying Process

Figure 6:
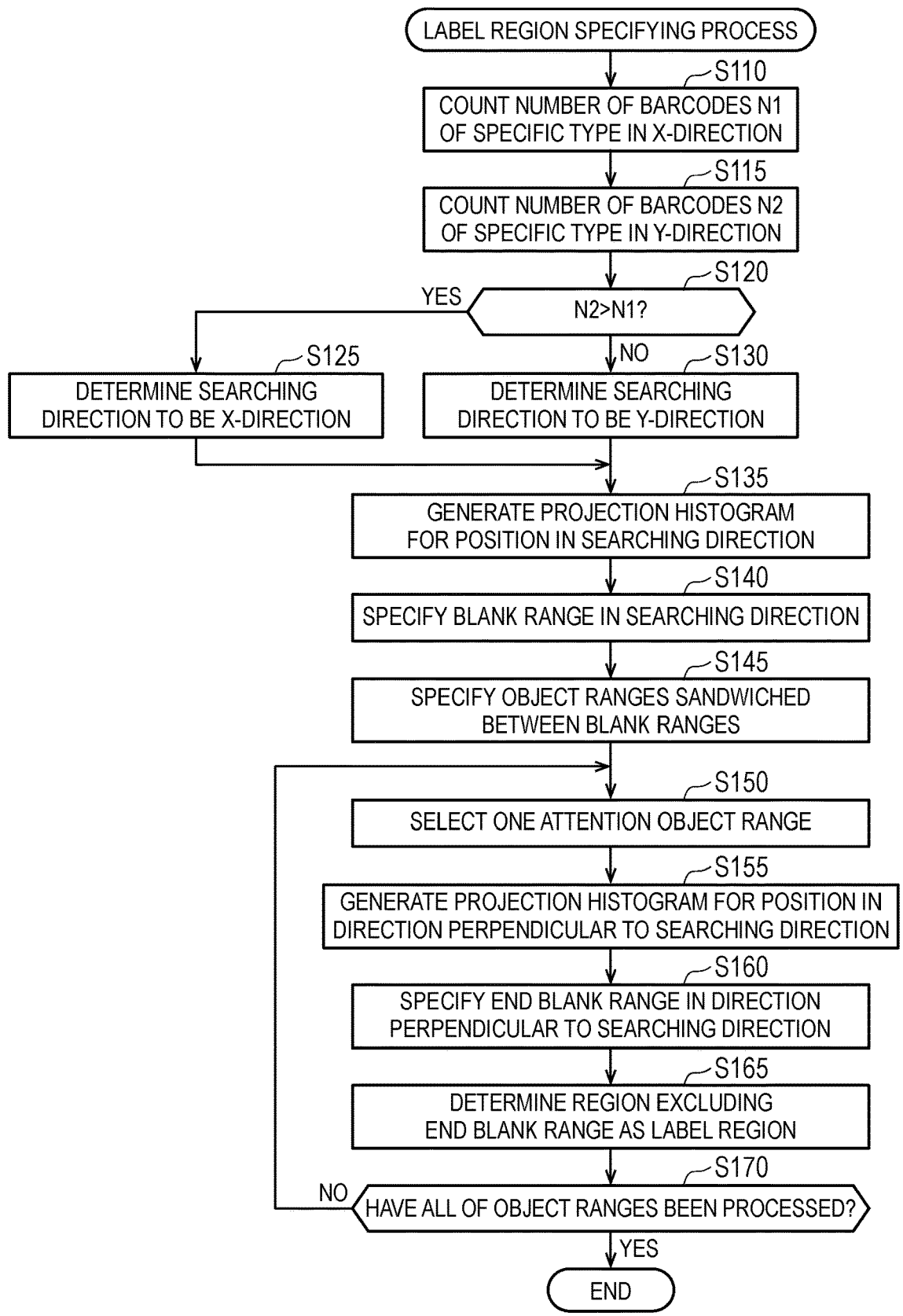
FIG. 6 is a flow chart of a label region specifying process.

Next, the label region specifying process of S15 in FIG. 3 will be described. As described above, the label region specifying process is a process of specifying one or more label regions included in the target image OI. FIG. 6 is a flow chart of the label region specifying process.

In S110, the CPU 210 counts the number of barcodes N1 of a specific type in the X-direction in the target image OI. Here, the barcode in the X-direction means a barcode in which an extension direction of bars is the X-direction as described above. In the present example, the barcode of a specific type is the above-described barcode of CODE128.

In S110, the CPU 210 counts the number of barcodes N1 of a specific type in the X-direction in the target image OI. The barcode in the X-direction means a barcode in which an extension direction of bars is the X-direction as described above. In the present example, the barcode of a specific type is the above-described barcode of CODE128. In the example of FIG. 4, both the two barcodes BCd and BCa of CODE128 included in the target image OI are barcodes in the Y-direction, and thus the number of barcodes of a specific type in the X-direction is zero (N1=0).

In S115, the CPU 210 counts the number of barcodes N2 of a specific type in the Y-direction in the target image OI. The barcode in the Y-direction means a barcode in which an extension direction of bars is the Y-direction as described above. In the example of FIG. 4, both the two barcodes BCd and BCa of CODE128 included in the target image OI are barcodes in the Y-direction, and thus the number of barcodes of a specific type in the Y-direction is two (N2=2).

In S120, the CPU 210 determines whether or not the relation of N2>N1 is satisfied, that is, whether or not the number of barcodes N2 of a specific type in the Y-direction is larger than the number of barcodes N1 of a specific type in the X-direction. When the number of barcodes N2 of a specific type in the Y-direction is larger than the number of barcodes N1 of a specific type in the X-direction (S120: YES), the CPU 210 determines a searching direction to be the X-direction in S125. When the number of barcodes N2 of a specific type in the Y-direction is equal to or less than the number of barcodes N1 of a specific type in the X-direction (S120: NO), the CPU 210 determines a searching direction to be the Y-direction in S130. In the example of FIG. 4, the number of barcodes N2 of a specific type in the Y-direction (two) is larger than the number of barcodes N1 of a specific type in the X-direction (zero), and thus a searching direction is determined to be the X-direction in S125.

In S135, the CPU 210 generates a projection histogram for the position of the target image OI in the searching direction. The projection histogram in the searching direction is a histogram obtained by classifying the plurality of pixels in the target image OI into a plurality of classes based on the position in the searching direction and counting the number of object pixels making an object in the target image OI with respect to each of the plurality of classes. For example, when the searching direction is the X-direction, a plurality of pixels having the same position in the X-direction, that is, a plurality of pixels on a line of one pixel extending in the Y-direction are classified as one class in the present example. For example, when the size of the target image OI is P pixels in the X-direction×Q pixels in the Y-direction, a plurality of pixels in the target image OI are classified into P classes, and the number of pixels belonging to one class is Q. In addition, the CPU 210 creates a projection histogram Hx in the X-direction by counting the number of object pixels among the Q pixels belonging to each class with respect to each of the P classes. The object pixel is a pixel having a color different from a background color (white in the present example). In the example of FIG. 4, all of the pixels making the characters TXa to TXc, the lines La and Lb, and the barcodes BCa to BCe in the target image OI are object pixels.

In the example of FIG. 4, the searching direction is determined to be the X-direction, and thus a projection histogram in the X-direction is created in S135. The projection histogram Hx in the X-direction is illustrated below the target image OI of FIG. 4.

In S140, the CPU 210 specifies a blank range in the searching direction. The blank range is a range in the searching direction in which a label image (an object such as a barcode, a character, or a line) is not positioned. The CPU 210 specifies a range in the searching direction in which the number of object pixels is equal to or less than a threshold value (for example, zero) in the projection histogram in the searching direction, as a blank range. In the example of FIG. 4, three blank ranges WR1 to WR3 in the X-direction which is the searching direction are specified.

In S145, the CPU 210 specifies one or more object ranges sandwiched between the specified blank ranges. In the example of FIG. 4, an object range OR1 sandwiched between two blank ranges WR1 and WR2 and an object range OR2 sandwiched between two blank ranges WR2 and WR3 are specified.

In S150, the CPU 210 selects one attention object range from one or more specified object ranges. In the example of FIG. 4, the object range OR1 and the object range OR2 are sequentially selected.

In S155, the CPU 210 generates a projection histogram for a position in a direction perpendicular to the searching direction of an image within the attention object range. The projection histogram in the direction perpendicular to the searching direction is a histogram obtained by classifying a plurality of pixels in the image within the attention object range into a plurality of classes based on the position in the direction perpendicular to the searching direction and counting the number of object pixels making an object with respect to each of the plurality of classes. For example, when the searching direction is the X-direction, a plurality of pixels having the same position in the Y-direction, that is, a plurality of pixels on a line of one pixel extending in the X-direction are classified as one class in the present example. For example, when the size of the image within the attention object range is K pixels in the X-direction×Q pixels in the Y-direction, a plurality of pixels in the image are classified into Q classes, and the number of pixels belonging to one class is K. In addition, the CPU 210 creates a projection histogram Hy in the Y-direction by counting the number of object pixels among the K pixels belonging to the classes with respect to each of the Q classes.

Figure 7A:
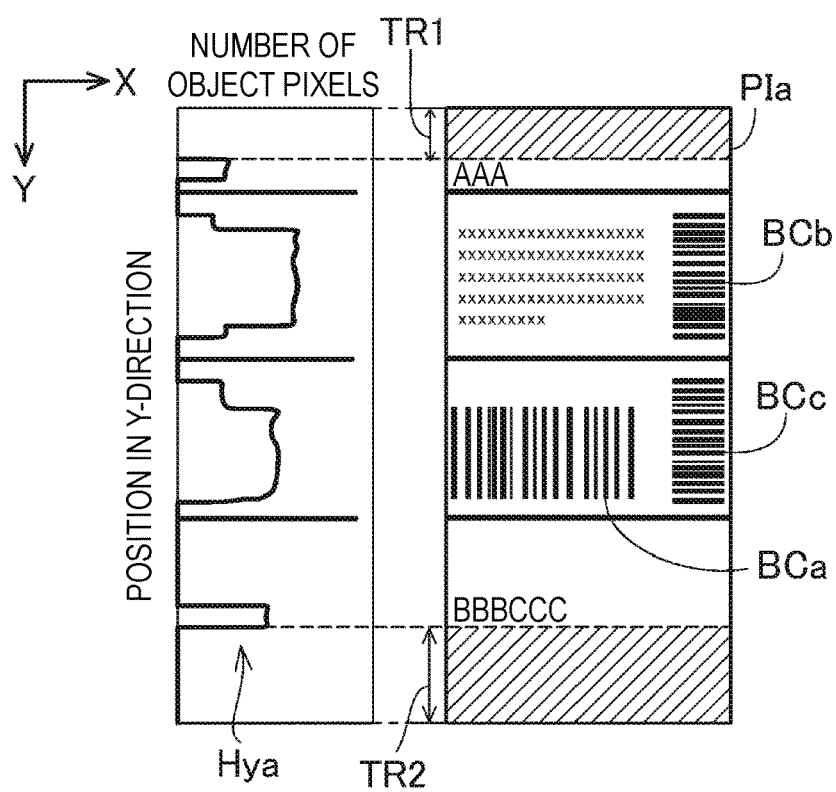
FIGS. 7A and 7B are diagrams illustrating examples of an image within an object range of a target image OI.
Figure 7B:
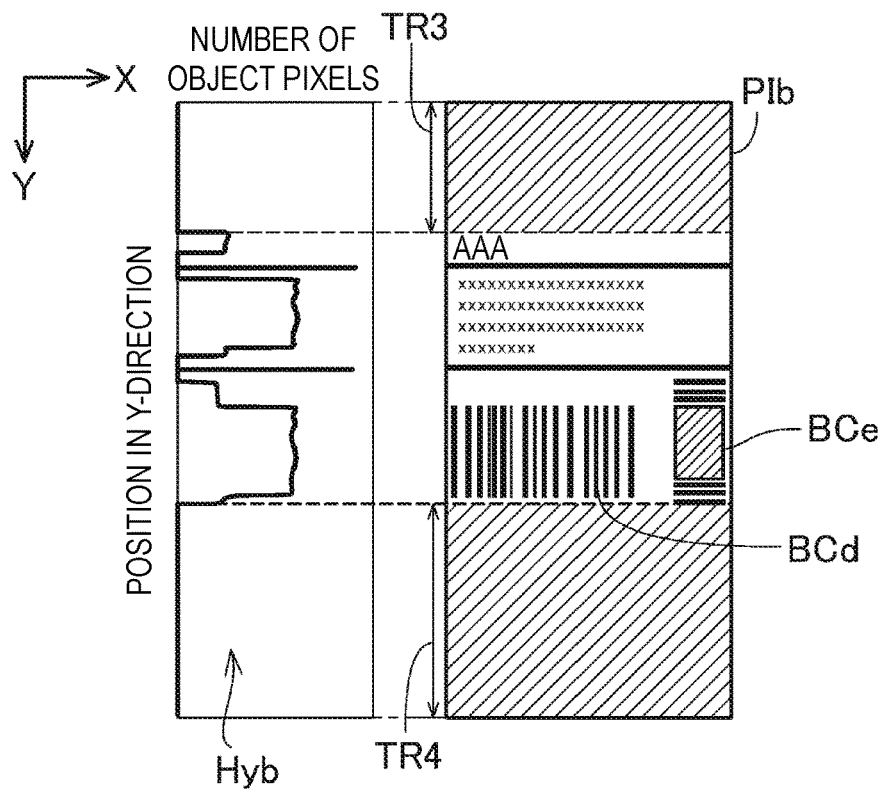

FIGS. 7A and 7B are diagrams illustrating examples of an image within the object range of the target image OI. In FIG. 7A, an image PIa within the object range OR1 (FIG. 4) is illustrated. A projection histogram Hya in the Y-direction is illustrated on the left side of the image PIa. In FIG. 7B, an image PIb within the object range OR2 (FIG. 4) is illustrated. A projection histogram Hyb in the Y-direction is illustrated on the left side of the image PIb.

In S160, the CPU 210 specifies an end blank range in a direction perpendicular to the searching direction. The end blank range is a range in a direction perpendicular to the searching direction in which a label image (an object such as a barcode, a character, or a line) is not positioned, and is a range including one of both ends in the direction perpendicular to the searching direction. The CPU 210 specifies a range including an end in the direction perpendicular to the searching direction, in a direction perpendicular to the searching direction in which the number of object pixels is equal to or less than a threshold value (for example, zero) in the projection histogram in the direction perpendicular to the searching direction, as an end blank range. In the example of FIG. 7A, two end blank ranges TR1 and TR2 in the Y-direction which is a direction perpendicular to the searching direction are specified. In the example of FIG. 7B, two end blank ranges TR3 and TR4 in the Y-direction which is a direction perpendicular to the searching direction are specified.

In S165, the CPU 210 specifies a region excluding the end blank range in the image within the attention object range as a label region. In the example of FIG. 7A, a rectangular region excluding a hatched end blank range in the image PIa within the object range OR1 (FIG. 4) is specified as a label region. In the example of FIG. 7B, a rectangular region excluding a hatched end blank range in the image PIb within the object range OR2 (FIG. 4) is specified as a label region.

In S170, the CPU 210 determines whether or not all of the object ranges specified in S145 have been processed as attention object ranges. When there is an unprocessed object range (S170: NO), the CPU 210 returns to S150. When all of the object ranges have been processed (S170: YES), the CPU 210 terminates the label region specifying process. As a result, in the example of FIG. 4, two label regions LA1 and LA2 within the target image OI are specified.

According to the label printing process including the above-described label region specifying process, the CPU 210 specifies one or more object ranges OR1 and OR2 by separating the object ranges OR1 and OR2 in which a label image is positioned from the blank range WR1 to WR3 in which a label image is not positioned with respect to each of a plurality of positions in the searching direction within the target image OI (S135 to S145 of FIG. 6). In addition, the CPU 210 outputs each of pieces of printing image data corresponding to label images within the one or more specified object ranges OR1 and OR2 (S75 and S80 of FIG. 3). The searching direction is a direction perpendicular to bars making the specified barcodes BCa and BCd (S15 of FIGS. 3, S120 and S125 of FIG. 6, and FIG. 4). In this manner, the object ranges OR1 and OR2 in which objects are positioned, excluding the blank ranges WR1 to WR3 in which a label image is not positioned, are specified with respect to a plurality of positions in the searching direction within the target image OI. As a result, since the object ranges OR1 and OR2 are specified with respect to a plurality of positions in a direction perpendicular to the bars making the barcodes BCa and BCd, it is possible to avoid the separation of a label image to be treated as one piece of image data due to a blank region present between the label image and the barcode. In addition, since printing image data corresponding to an image within an object range is output, the printing image data appropriately indicating a label image including a barcode may be output so as not to include an extra blank region.

For example, in a label image, there is a high possibility that objects are present with no gap without leaving a blank with respect to a direction perpendicular to at least one barcode made by bars extending in the vertical direction when the label image is visually recognized in an assumed direction, that is, the horizontal direction during visual recognition. For example, in the example of FIG. 4, there is a high possibility that objects are present with no gap without leaving a blank with respect to a direction perpendicular to the directions of the barcodes BCa and BCd. For example, in the example of FIG. 4, since the line La extending in the X-direction perpendicular to the barcodes BCa and BCd is present, objects are present with no gap. As a result, label images to be integrally output are not separated from each other by specifying the object ranges OR1 and OR2 in the X direction. When the Y-direction parallel with the barcodes BCa and BCd is set to be a searching direction, for example, the ranges WRa and WRb in the Y-direction illustrated in FIG. 4 are specified as blank ranges. In this case, label images to be integrally output are separated into a plurality of parts. In the present example, since the X-direction perpendicular to the barcodes BCa and BCd is determined as a searching direction, it is possible to suppress such a disadvantage.

Further, according to the above-described label printing process, the CPU 210 determines a direction perpendicular to bar codes of a specific type in the Y-direction, that is, the X-direction as a searching direction when the number of barcodes N2 of a specific type (barcodes of CODE128 in the present example) in the Y-direction is larger than the number of barcodes N1 of a specific type in the X-direction among the plurality of barcodes BCa to BCe (FIG. 4) in the target image OI (S120 and S125 of FIG. 6). As a result, when a plurality of barcodes of a specific type are included in the target image OI, it is possible to appropriately determine a searching direction. Therefore, it is possible to further appropriately suppress the separation of label images to be integrally output into a plurality of parts. For example, in the field of logistics, barcodes of CODE128 are used widely, and it is important to appropriately print label images including the barcodes of CODE128. For this reason, there is a high possibility that the barcodes of CODE128 are disposed in a direction in which bars extend in the vertical direction when the label images are visually recognized in an assumed direction. Therefore, when a direction perpendicular to a large number of barcodes of CODE128 is set to be a searching direction, a possibility that appropriate object ranges OR1 and OR2 can be specified so as not to separate the label images from each other is increased.

Further, according to the above-described label printing process, the CPU 210 generates a projection histogram (for example, the projection histogram Hx of FIG. 4) for a position in a searching direction (S135 of FIG. 6) and specifies the object ranges OR1 and OR2 and the blank range WR1 to WR3 using the histogram (S140 and S145 of FIG. 6). As a result, since it is possible to accurately and easily determine the presence or absence of a label image made by object pixels with respect to a plurality of positions in the searching direction by using the projection histogram Hx, it is possible to accurately and easily specify the object ranges OR1 and OR2 and the blank ranges WR1 to WR3.

Further, according to the above-described label printing process, the end blank ranges TR1 and TR2 of the image within the object range OR1 are specified (S160 of FIG. 6), and regions excluding images within the end blank ranges TR1 and TR2 in the image within the object range OR1 is specified as a label region (S165 of FIG. 6). In addition, printing image data corresponding to a label image in the label region is output (S25, S75, and S80 of FIG. 3). As a result, the printing image data appropriately indicating a label image within the object range OR1 can be output by further suppressing inclusion of an extra blank.

Further, according to the above-described label printing process, the CPU 210 executes a barcode label reduction process for reducing label images within the object ranges OR1 and OR2 to a size corresponding to a sheet for a label as a printing medium (S60 of FIG. 3), and outputs printing image data corresponding to the reduced label images to the label printer 100 as a printing execution unit (S80 of FIG. 3). As a result, the label images within the object ranges OR1 and OR2 are printed in appropriate sizes by the label printer 100.

As described above, the searching direction in the present example is an example of a first direction, a direction perpendicular to the searching direction is an example of a second direction, and a label image is an example of a partial image.

A-4. Printing Direction Determination Process

Figure 8:
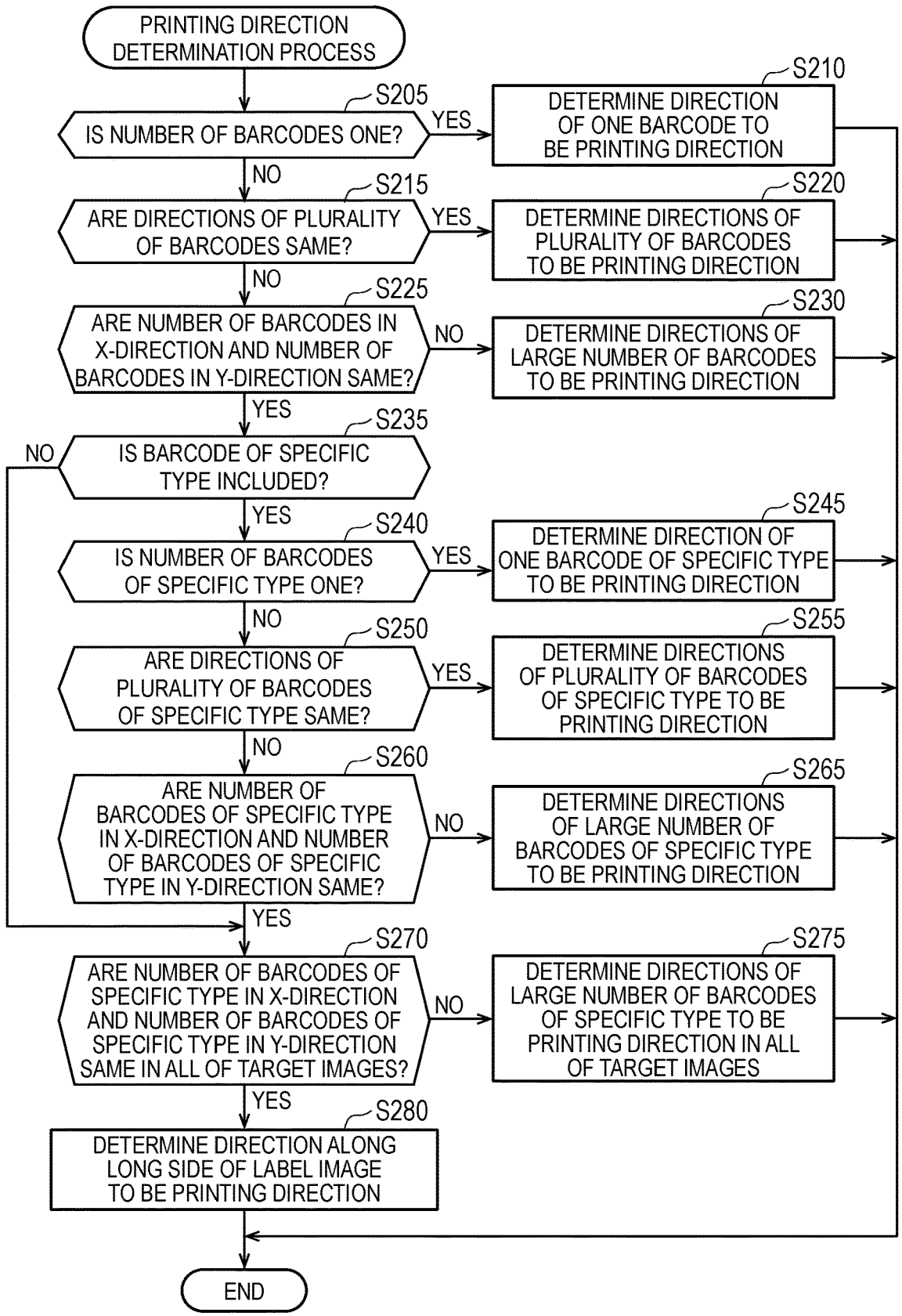
FIG. 8 is a flow chart of a printing direction determination process.

Next, the printing direction determination process in S45 of FIG. 3 will be described. As described above, the printing direction determination process is a process of determining a printing direction when a label image within an attention label region (hereinafter, simply referred to as a label image) is printed using label image data. FIG. 8 is a flowchart of the printing direction determination process.

In S205, the CPU 210 determines whether or not the number of barcodes included in a label image is one. For example, when the first label region LA1 or the second label region LA2 in FIG. 4 is an attention label region, a plurality of barcodes are included in a label image within any region as illustrated in FIG. 4. Therefore, in this case, it is determined that the number of barcodes included in the label image is not one.

When the number of barcodes included in the label image is one (S205: YES), the CPU 210 determines the direction (the X-direction or the Y-direction) of one barcode to be a printing direction in S210 and terminates the printing direction determination process. When the number of barcodes included in the label image is two or more (S205: NO), the CPU 210 causes the processing to proceed to S215.

In S215, the CPU 210 determines whether or not the directions of the plurality of barcodes included in the label image are the same as each other. For example, when the first label region LA1 of FIG. 4 is an attention label region, the barcodes BCb and BCc in the X-direction and the barcode BCa in the Y-direction are included in a label image in the region as illustrated in FIG. 4. Therefore, in this case, it is determined that the directions of the barcodes included in the label image are not the same as each other. Even when the second label region LA2 in FIG. 4 is an attention label region, the same applies.

When all of the directions of the plurality of barcodes included in the label image are the same as each other (S215: YES), the CPU 210 determines the directions (the X-direction or the Y-direction) of the plurality of barcodes included in the label image to be printing directions in S220 and terminates the printing direction determination process. When the directions of the plurality of barcodes included in the label image are not the same as each other, that is, when the directions of the plurality of barcodes included in the label image include both the X-direction and the Y-direction (S215: NO) in the present example, the CPU 210 causes the processing to proceed to S225.

In S225, the CPU 210 determines whether or not the number of barcodes in the X-direction is the same as the number of barcodes in the Y-direction included in the label image. For example, when the first label region LA1 in FIG. 4 is an attention label region, two barcodes BCb and BCc in the X-direction and one barcode BCa in the Y-direction are included in the label image in the region as illustrated in FIG. 4. Therefore, in this case, it is determined that the number of barcodes in the X-direction is not the same as the number of barcodes in the Y-direction. When the second label region LA2 in FIG. 4 is an attention label region, one barcode BCe in the X-direction and one barcode BCd in the Y-direction are included in the label image in the region as illustrated in FIG. 4. Therefore, in this case, it is determined that the number of barcodes in the X-direction is the same as the number of barcodes in the Y-direction.

When the number of barcodes in the X-direction is not the same as the number of barcodes in the Y-direction (S225: NO), the CPU 210 determines the direction of a larger number of barcodes out of the barcodes in the X-direction and the barcodes in the Y-direction to be a printing direction in S230 and terminates the printing direction determination process. For example, when the first label region LA1 in FIG. 4 is an attention label region, a printing direction is determined to be the X-direction which is the direction of the two barcodes BCb and BCc in this step. When the number of barcodes in the X-direction is the same as the number of barcodes in the Y-direction (S225: YES), the CPU 210 causes the processing to proceed to S235.

In S235, the CPU 210 determines whether or not the label image includes a barcode of a specific type, that is, the above-described barcode of CODE128 in the present example. For example, when the second label region LA2 in FIG. 4 is an attention label region, one barcode BCd of CODE128 is included in the label image in the region as illustrated in FIG. 4, and thus it is determined that the label image includes a barcode of a specific type.

When the label image includes a barcode of a specific type (S235: YES), the CPU 210 causes the processing to proceed to S240. When the label image does not include a barcode of a specific type (S235: NO), the CPU 210 causes the processing to proceed to S270.

In S240 to S265, the CPU 210 executes the same processes as S205 to S230 described above, based on only the barcode of a specific type (the barcode of CODE128 in the present example) included in the label image. Specifically, in S240, the CPU 210 determines whether or not the number of barcodes of a specific type included in the label image is one.

When the number of barcodes of a specific type included in the label image is one (S240: YES), the CPU 210 determines the direction of one barcode of a specific type to be a printing direction in S245 and terminates the printing direction determination process. For example, when the second label region LA2 in FIG. 4 is an attention label region, one barcode BCd of CODE128 is included in the label image in the region as illustrated in FIG. 4. Therefore, in this case, a printing direction is determined to be the Y-direction which is the direction of the barcode BCd in this step. When the number of barcodes of a specific type included in the label image is two or more (S240: NO), the CPU 210 causes the processing to proceed to S250.

In S250, the CPU 210 determines whether or not all of the directions of the plurality of barcodes of a specific type included in the label image are the same as each other. When all of the directions of the plurality of barcodes of a specific type included in the label image are the same as each other (S250: YES), the CPU 210 determines the directions of the plurality of barcodes of a specific type included in the label image to be printing directions in S255 and terminates the printing direction determination process. When the directions of the plurality of barcodes of a specific type included in the label image are not the same as each other, that is, when the directions of the plurality of barcodes of a specific type included in the label image include both the X-direction and the Y-direction in the present example, the CPU 210 causes the processing to proceed to S260.

In S260, the CPU 210 determines whether or not the number of barcodes of a specific type in the X-direction is the same as the number of barcodes of a specific type in the Y-direction which are included in the label image. When the number of barcodes of a specific type in the X-direction is not the same as the number of barcodes of a specific type in the Y-direction (S260: NO), the CPU 210 determines the direction of a larger number of barcodes out of the barcodes of a specific type in the X-direction and the barcodes of a specific type in the Y-direction to be a printing direction in S265 and terminates the printing direction determination process. When the number of barcodes of a specific type in the X-direction is the same as the number of barcodes of a specific type in the Y-direction (S260: YES), the CPU 210 causes the processing to proceed to S270.

In S270, the CPU 210 determines whether or not the number of barcodes of a specific type in the X-direction is the same as the number of barcodes of a specific type in the Y-direction in the entire target image.

Figure 9:
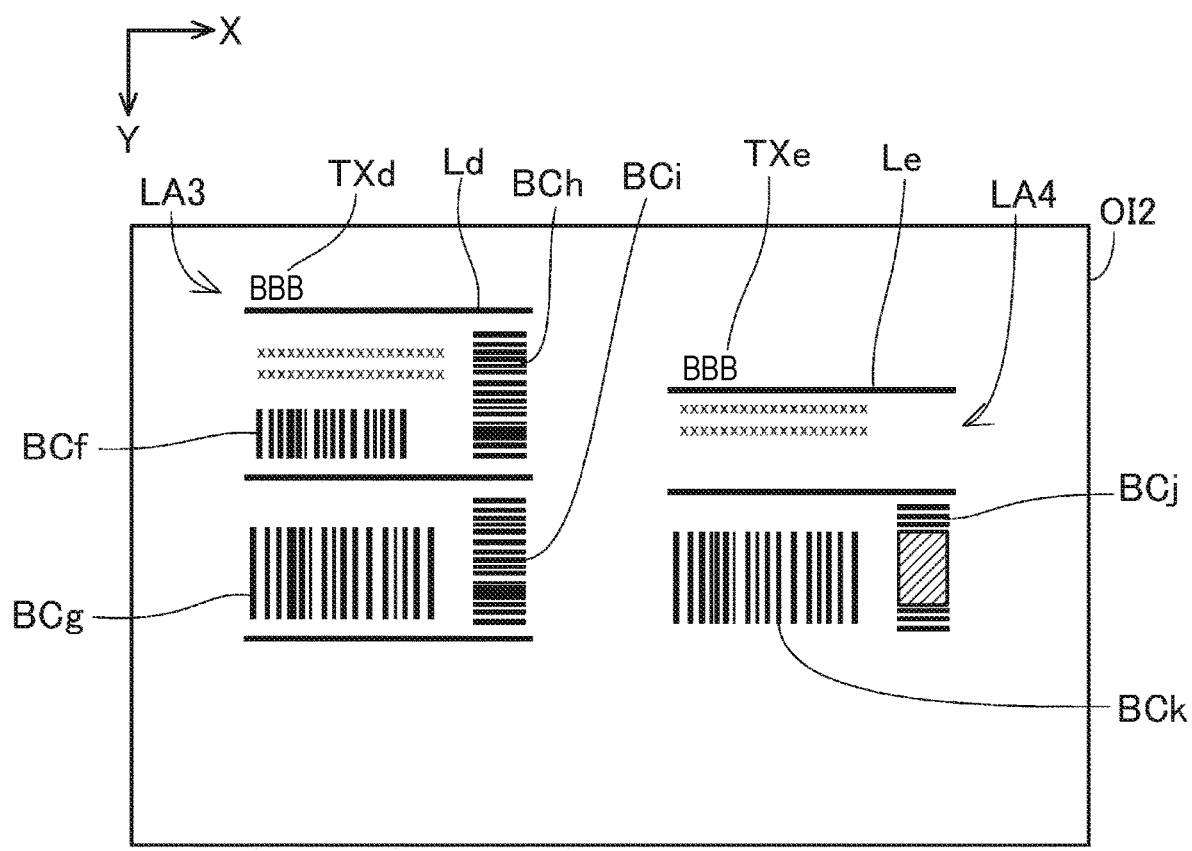
FIG. 9 is a diagram illustrating another example of a target image.

FIG. 9 is a diagram illustrating another example of a target image. A target image OI2 in FIG. 9 includes a plurality of pixels arranged in a matrix along the X-direction (the horizontal direction in FIG. 9) and the Y-direction (the vertical direction in FIG. 9), similar to the target image OI in FIG. 4. The target image OI2 includes a third label region LA3 and a fourth label region LA4. The third label region LA3 includes a plurality of barcodes BCf to BCi, and objects such as characters TXd and a line Ld, which are different from the barcodes, as objects. The fourth label region LA4 includes a plurality of barcodes BCj and BCk, and objects such as characters TXe and a line Lb, which are different from the barcodes, as objects. Among the barcodes BCf to BCk, two barcodes BCg and BCh included in the third label region LA3 and one barcode BCk included in the fourth label region LA4 are barcodes of CODE128 (barcodes of a specific type in the present example). The remaining barcodes BCf, BCi, and BCj are barcodes of a type different from that of CODE128.

When the third label region LA3 in FIG. 9 is an attention label region, a label image in the region includes two barcodes BCh and BCi in the X-direction and two barcodes BCf and BCg in the Y-direction, and thus a printing direction is not determined in the processes of S205 to S230 (NO in S205, NO in S215, and YES in S225). In addition, the label image in the region includes one barcode BCh of CODE128 of CODE128 in the X-direction and one barcode BCg of CODE128 in the Y-direction, and thus a printing direction is not determined in the processes of S240 to S265 (NO in S240, NO in S250, and YES in S260). In the entire target image OI2 in FIG. 9, one barcode BCh of CODE128 in the X-direction and two barcodes BCg and BCk of CODE128 in the Y-direction are included. Therefore, in S270, it is determined that the number of barcodes of a specific type in the X-direction is not the same as the number of barcodes of a specific type in the Y-direction in the entire target image.

When the number of barcodes of a specific type in the X-direction is not the same as the number of barcodes of a specific type in the Y-direction in the entire target image (S270: NO), the CPU 210 determines the direction of a larger number of barcodes in the entire target image out of the barcodes of a specific type in the X-direction and the barcodes of a specific type in the Y-direction to be a printing direction in S275 and terminates the printing direction determination process. In the example of FIG. 9, the directions of two barcodes BCg and BCk of CODE128, that is, the Y-direction is determined to be a printing direction. When the number of barcodes of a specific type in the X-direction is the same as the number of barcodes of a specific type in the Y-direction in the entire target image (S270: YES), the CPU 210 causes the processing to proceed to S280.

In S280, the CPU 210 determines a direction along a long side of the label image in the attention label region to be a printing direction and terminates the printing direction determination process. That is, the CPU 210 calculates the number of pixels in the X-direction and the number of pixels in the Y-direction of the attention label region. The CPU 210 determines the X-direction to be a printing direction when the number of pixels in X-direction is equal to or larger than the number of pixels in Y-direction, and determines the Y-direction to be a printing direction when the number of pixels in X-direction is less than the number of pixels in Y-direction. As a result, when the label image in the attention label region is printed, a direction along a short side of the label image corresponds to the lateral direction of the belt-like sheet for forming the roller 3. Therefore, in S60 of FIG. 3, it is possible to reduce the probability that the label image is reduced and to reduce the degree of reduction even when the label image is reduced.

According to the label printing process including the above-described printing direction determination process, the label regions LA1 and LA2 in the target image OI include the barcodes BCb, BCc, and BCe in the X-direction having bars extending in the X-direction and the barcodes BCa and BCd in the Y-direction having bars extending in the Y-direction different from the X-direction (FIG. 4). The CPU 210 determines printing directions of the label images in the label regions LA1 and LA2 based on at least one of the types of barcodes in the X-direction and the Y-direction and the numbers of barcodes in the X-direction and the Y-direction. The printing directions are determined to be directions parallel with any one of the directions of these barcodes (the X-direction and the Y-direction). In addition, the CPU 210 generates printing image data for printing labels in the label regions LA1 and LA2 in the determined printing directions (S50 to S60 and S75 in FIG. 3) and outputs the printing image data to the label printer 100 (S80 in FIG. 3). As a result, the label images in the label regions LA1 and LA2 including a plurality of barcodes can be appropriately printed.

In order to read the printed barcodes without causing a reading error, it is preferable to print the barcodes with high accuracy so that the ratio of thicknesses of a plurality of bars (black lines BB and white lines WB) making a barcode is a ratio indicated by target image data. In the label printer 100 of the present example, when a transport direction of a sheet for a label is perpendicular to the bars to be printed, printing positions of the plurality of black lines BB may be shifted from target positions in a transport direction, that is, a direction perpendicular to the black lines BB when a transport error of the label printer 100 occurs. Further, when the transport direction of the sheet for a label is perpendicular to the bars to be printed, the plurality of black lines BB making the barcode are sequentially printed one by one during the printing of the barcode. For this reason, in this case, the thermal head 162 repeatedly executes the formation of dots by heating and non-formation of dots by the stop of heating. In this case, when the actual temperature of the heating element of the thermal head cannot sufficiently follow the control, the black lines BB and the white lines WB to be printed may have a thickness different from a target thickness. On the other hand, when the transport direction of the sheet for a label is parallel with the bars to be printed, the lengths of the black lines BB to be printed in the longitudinal direction can be varied even if a transport error of the label printer 100 occurs, and the thicknesses and the positions in the vertical direction of the black lines BB to be printed are hardly influenced. In addition, when the transport direction of the sheet for a label is parallel with the bars to be printed, the thermal head 162 can print the barcodes by heating the heating element at a position corresponding to the black lines BB and maintaining a state where the element at a position corresponding to the white lines WB is not heated at the time of printing. For this reason, in this case, the black lines BB and the white lines WB to be printed hardly have a thickness different from a target thickness. Therefore, when printing is performed by the label printer 100 of the present example, it is preferable that the printing direction is made to be consistent with the direction of a barcode so that a transport direction becomes parallel with bars to be printed. According to the present example, a printing direction is determined to be a direction parallel with any one of the directions of these barcodes (the X-direction and the Y-direction) based on at least one of the types of barcodes in the X-direction and the Y-direction and the numbers of barcodes in the X-direction and the Y-direction.

For example, according to the above-described label printing process, the CPU 210 determines the X-direction as a printing direction when the number of barcodes in the X-direction is larger than the number of barcodes in the Y-direction, and determines the Y-direction as a printing direction when the number of barcodes in the Y-direction is larger than the number of barcodes in the X-direction (S225 and S230 in FIG. 8). For example, the target image OI in FIG. 4 includes the first label region LA1 including the plurality of barcodes BCa to BCc. Regarding the label image in the first label region LA1, a printing direction is determined to be the X-direction which is the direction of a larger number of barcodes out of the barcodes BCb and BCc in the X-direction and the barcode BCa in the Y-direction. As a result, an appropriate printing direction can be determined in accordance with the number of barcodes in the X-direction and the number of barcodes in the Y-direction. For example, a label image in a label region is appropriately printed to be able to suppress the occurrence of a reading error of a large number of barcodes.

For example, according to the above-described label printing process, the CPU 210 determines the X-direction which is the direction of a barcode of a specific type as a printing direction when the barcode in the X-direction included in the label region is a barcode of a specific type (a barcode of CODE128) and a second barcode in the Y-direction is different from the barcode of the specific type (S240, S245, S250, and S255 in FIG. 8). The CPU 210 determines the Y-direction which is the direction of a barcode of a specific type as a printing direction when the barcode in the Y-direction is a barcode of a specific type and the barcode in the X-direction is different from the barcode of the specific type (S240, S245, S250, and S255 in FIG. 8). For example, the target image OI of FIG. 4 includes the barcode BCd of a specific type in the X-direction and the barcode BCe in the Y-direction of a type different from the barcode BCe in the Y-direction. For this reason, the CPU 210 determines a printing direction of a label image in the second label region LA2 to be the Y-direction which is the direction of the barcode BCd of a specific type. As a result, an appropriate printing direction can be determined in accordance with whether or not the barcode in the X-direction and the barcode in the Y-direction are a barcode of a specific type. For example, a label image in a label region is appropriately printed to be able to suppress the occurrence of a reading error of the barcode of a specific type.

Further, according to the above-described label printing process, the CPU 210 determines the X-direction to be a printing direction when the number of barcodes of a specific type in the X-direction is larger than the number of barcodes of a specific type in the Y-direction, and determines the Y-direction to be a printing direction when the number of barcodes of a specific type in the Y-direction is larger than the number of barcodes of a specific type in the X-direction (S260 and S265 in FIG. 8). As a result, an appropriate printing direction can be determined in accordance with both the types and numbers of barcodes in the X-direction and the Y-direction. For example, a label image in a label region is appropriately printed to be able to suppress the occurrence of a reading error of a large number of barcodes of a specific type.

Further, according to the above-described label printing process, when a printing direction cannot be determined based on the types of barcodes BCh and BCi in the X-direction and the barcodes BCf and BCg in the Y-direction in the third label region LA3 of the target image OI2 in FIG. 9 and the numbers of the barcodes BCh and BCi in the X-direction and the barcodes BCf and BCg in the Y-direction (S260 in FIG. 8: NO), the CPU 210 determines a printing direction of a label image in the third label region LA3 based on the types and numbers of the barcode BCj in the X-direction and the barcode BCk in the Y-direction in the fourth label region LA4. Specifically, the printing direction of the label image in the third label region LA3 is determined to be the direction of a large number of barcodes of a specific type in the entire target image OI2 (S270 and S280 in FIG. 8). As a result, an appropriate printing direction can be determined even when a printing direction cannot be determined based on the types and numbers of the barcodes BCj in the X-direction and the barcodes BCk in the Y-direction in the third label region LA3. Specifically, barcodes with high importance tend to be disposed in the same direction in the target image OI2 even when a plurality of label regions are included in one target image OI2. For this reason, even when a printing direction cannot be determined only with the numbers and types of barcodes in one label region, an appropriate printing direction can be determined in consideration of the numbers and types of barcodes in other label regions.

Further, according to the above-described label printing process, when a printing direction cannot be determined based on the types and numbers of barcodes in the X-direction and barcodes in the Y-direction (S270 in FIG. 8: YES), the CPU 210 determines a direction along a long side of a label image in a label region, out of the X-direction and the Y-direction, to be a printing direction (S280 in FIG. 8). When the direction along the long side is set to be a printing direction, a short side of the label image corresponds to a direction perpendicular to a transport direction of a sheet for a label in the present example. For this reason, it can be said that a direction in which the degree of reduction by the barcode label reduction process (S60 in FIG. 3) is low is determined as a printing direction in S280. As a result, an appropriate printing direction can be determined even if a printing direction cannot be determined based on the types and numbers of barcodes in a target image. For example, a reading error of barcodes to be printed tends to occur when the degree of reduction is excessively high, but it is possible to suppress an excessive increase in the degree of reduction.

A-5. Barcode Label Reduction Process

Figure 10:
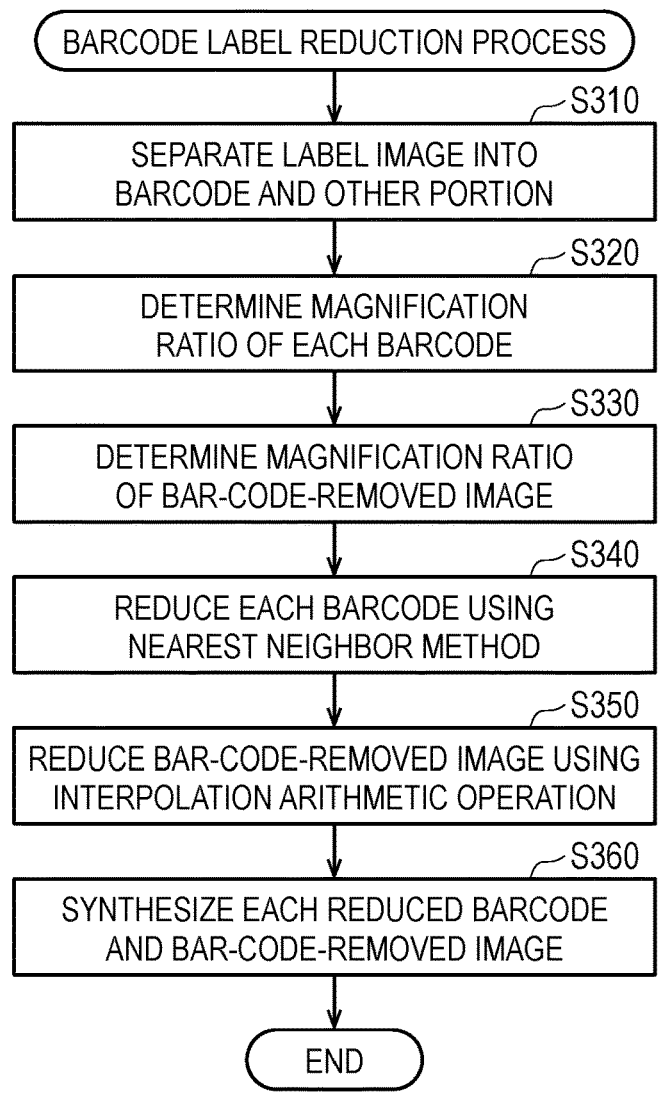
FIG. 10 is a flow chart of a barcode label reduction process.
Figure 10:
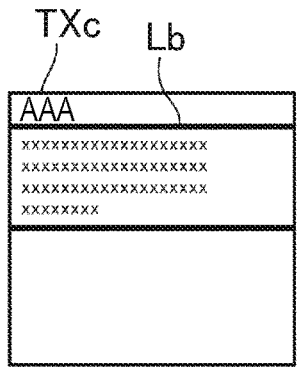
Figure 10:
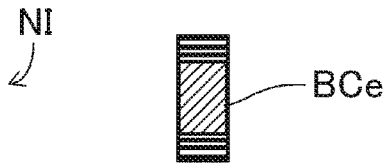
Figure 10:

Next, the barcode label reduction process of S60 in FIG. 3 will be described. The barcode label reduction process is a process of reducing a label image including a barcode to generate label image data indicating the reduced label image in which the width of the label image in the X-direction is equal to or less than the width of a printing medium. FIG. 10 is a flowchart of the barcode label reduction process. FIGS. 11A to 11C are diagrams illustrating the barcode label reduction process.

In S310, the CPU 210 separates the label image into a barcode and other portions. That is, the CPU 210 generates barcode data indicating a barcode in the label image and bar-code-removed image data indicating a bar-code-removed image which is a portion excluding the barcode in the label image by using the label image data. In FIG. 11A, a bar-code-removed image NI obtained by removing the barcodes BCd and BCe from the label image in the second label region LA2 in FIG. 4 is illustrated. In FIGS. 11B and 11C, the barcodes BCd and BCe in the label image in the second label region LA2 in FIG. 4 are illustrated.

In S320, a magnification ratio RB of each barcode is determined. Specifically, the CPU 210 calculates the magnification ratio Rmax in which the width of the label image in the X-direction is set to be the width of the printing medium. The CPU 210 determines candidates for the magnification ratio RB with respect to each barcode so that the thickness (the number of pixels) of the thinnest bar among bars making one barcode is set to an integer even after reduction. For example, when the thickness of the thinnest bar is three pixels, (2/3) and (1/3) become candidates for the magnification ratio RB so that the thickness of the bar after reduction is set to an integer (two pixels or one pixel). When the thickness of the thinnest bar is five pixels, (4/5), (3/5), (2/5), and (1/5) become candidates for the magnification ratio RB so that the thickness of the bar after reduction is set to an integer (any one of four pixels, three pixels, two pixels, and one pixel). The CPU 210 determines the maximum magnification ratio equal to or less than a magnification ratio Rmax, among the candidates for the magnification ratio RB of each barcode, as the magnification ratio RB of each barcode. For example, it is assumed that the magnification ratio Rmax is 0.9, the thickness of the thinnest bar of the barcode BCd is five pixels, and the thickness of the thinnest bar of the barcode BCe is three pixels. In this case, the magnification ratio RB of the barcode BCd is determined to be (4/5), and the magnification ratio RB of the barcode BCe is determined to be (2/3).

In S330, the CPU 210 determines a magnification ratio RN of the bar-code-removed image NI. The magnification ratio RN is determined to be a maximum value among magnification ratios RB of one or more barcodes. As described above, when the magnification ratio RB of the barcode BCd is determined to be (4/5) and the magnification ratio RB of the barcode BCe is determined to be (2/3), the magnification ratio RN is determined to be (4/5). In this manner, the magnification ratio RN is determined, and thus it is possible to suppress a variation in the ratio of the thickness of each bar (a white line WB or a black line BB) in the reduced barcode as compared to that before reduction. Therefore, it is possible to suppress the occurrence of a reading error of the reduced barcode when the reduced barcode is printed.

In S340, the CPU 210 executes a reduction process on each barcode data to reduce each barcode with the determined magnification ratio RB. In the reduction process for barcode data, a method using an interpolation arithmetic operation, specifically, the nearest neighbor method is used.

In S350, the CPU 210 executes a reduction process, which is different from that for barcode data, on bar-code-removed image data to reduce the bar-code-removed image with the determined magnification ratio RN. In the reduction process for the bar-code-removed image data, a method using an interpolation arithmetic operation, specifically, a bi-cubic method or a bi-linear method is used.

In S360, the CPU 210 executes a synthesis process of synthesizing the reduced barcodes BCe and BCd and the reduced bar-code-removed image NI. Specifically, the reduced barcodes BCe and BCd are disposed at positions corresponding to the positions of the barcodes of the original label image on the reduced bar-code-removed image NI. As a result, the processed label image data indicating the processed label image FIb illustrated in FIG. 5B is generated.

According to the label printing process including the above-described barcode label reduction process, when a barcode is included in a label image within an object range (YES in S30 of FIG. 3), the barcode label reduction process of FIG. 10 is executed (S45 in FIG. 3). In the barcode label reduction process, the barcodes BCe and BCd (FIG. 11) are reduced in accordance with a reduction method not using an interpolation arithmetic operation (340 in FIG. 10). In addition, the bar-code-removed image NI excluding the barcode is reduced in accordance with a reduction method using an interpolation arithmetic operation (S350 in FIG. 10). When a barcode is reduced using an interpolation arithmetic operation, there is a concern that a reading error of the barcode may occur due to the blurring of boundaries between white lines WB and black lines BB making the barcode. Since blurring of boundaries between the white lines WB and the black lines BB can be reduced by reducing the barcode in accordance with a reduction method not using an interpolation arithmetic operation, it is possible to suppress the occurrence of a reading error. Further, when objects other than the barcode (that is, characters and lines in the bar-code-removed image NI) are reduced using an interpolation arithmetic operation, the appearance of the objects other than the barcode becomes more natural than a case where an interpolation arithmetic operation is not used. Therefore, in the above-described example, it is possible to improve the appearance of a reduced label image while suppressing the occurrence of a reading error of a reduced barcode.

Further, when a barcode is not included in a label image within an object range (NO in S30 of FIG. 3), the label image within the object range is reduced in accordance with a reduction method using an interpolation arithmetic operation (S40 in FIG. 10). Therefore, it is possible to improve the appearance of a reduced label image.

In this manner, in the present example, a label image reduced through an appropriate reduction process in accordance with the type of object in a label image can be printed.

Further, in the present example, printing image data is output to the label printer 100 in S80 of FIG. 3. A sheet for a label is configured such that a sheet main body (label portion) is not separable from release paper (non-label portion), as described above. In the present example, since label image data is output so that a label image is appropriately printed on the sheet main body, the label image is printed on a sheet for a label, and thus a user can easily attach the sheet main body having a label printed thereon to a commodity.

B. Modification Example:

(1) In the above-described example, a barcode of a specific type is a barcode of CODE128, but the barcode of a specific type may be a barcode of a different type. For example, the type of barcode to be considered important may vary depending on a category of business or the type of product to which a label is to be attached. It is preferable that the barcode of a specific type is a barcode of a type to be considered important in a label to be used and may be, for example, a barcode of JAN, CODE39, or NW-7.

(2) In the label region process of FIG. 6 in the above-described example, a direction perpendicular to the direction of a larger number of barcodes, out of barcodes of a specific type in the X-direction and barcodes of a specific type in the Y-direction, is determined to be the searching direction (S110 to S130 in FIG. 6). Alternatively, a direction perpendicular to the direction of a larger number of barcodes, out of barcodes in the X-direction and barcodes in the Y-direction, may be determined to be the searching direction regardless of whether or not barcodes are barcodes of a specific type. In addition, a direction perpendicular to bars of the largest barcode among barcodes in a target image O may be determined to be the searching direction. Alternatively, a direction perpendicular to the direction of a larger number of barcodes, out of barcodes having sizes equal to or larger than a reference size, may be determined to be the searching direction.

(3) In the above-described example, it is assumed that a barcode in a target image OI is any one barcode out of a barcode in the X-direction and a barcode in the Y-direction. Alternatively, a barcode in the target image OI may include a barcode in an inclined direction. In this case, a searching direction may be determined to be a direction perpendicular to the barcode in the inclined direction in the label region specifying process of FIG. 6, and a projection histogram for a position in the searching direction may be generated in S135 of FIG. 6.

(4) In the label region process of FIG. 6 in the above-described example, the blank ranges WR1 to WR3 and the object ranges OR1 and OR2 are specified using a projection histogram (S140, S145). Alternatively, blank ranges and object ranges may be specified without using a projection histogram. For example, when a searching direction is the X-direction, the CPU 210 searches for an object pixel from an end in the −Y direction to the +Y direction with respect to each pixel position in the X-direction. The pixel position may be determined to be a position making an object range when an object pixel is found, and the pixel position may be determined to be a position making a blank range when an object pixel is not found.

(5) In the label region process of FIG. 6 in the above-described example, S150 to S170 may be omitted. For example, the entirety of the object ranges OR1 and OR2 may be specified as a label region. In this case, printing image data corresponding to the entirety (including a hatched end) of the image PIa within the object range OR1 and the image PIb within the object range OR2 illustrated in FIGS. 7A and 7B is output. In addition, a label region may be specified by a method different from that in S150 to S170. For example, the separation of label images in a label region may be avoided by changing a threshold value for specifying a blank range to S140.

(6) The reduction process (S60 and S40) in the label printing process in FIG. 3 may be omitted, for example, when a printer using a sufficiently large printing medium (for example, a laser printer) is used instead of the label printer 100. In addition, the barcode label reduction process of S60 may be a process of reducing the entire label image using an interpolation arithmetic operation, similar to S40. In addition, the barcode label reduction process of S60 may be a process of reducing the entire label image using, for example, the nearest neighbor method without using an interpolation arithmetic operation.

(7) In the printing direction determination process in FIG. 8 in the above-described example, a printing direction is determined based on only the numbers and types of barcodes in the X-direction and barcodes in the Y-direction. Alternatively, a printing direction may be determined using other features of barcodes in the X-direction and barcodes in the Y-direction, for example, the sizes thereof or the thicknesses of bars, in addition to the numbers and types of barcodes in the X-direction and barcodes in the Y-direction. For example, based on the fact that a barcode having sizes larger than a reference size is unlikely to cause a reading error regardless of a printing direction, only barcodes having sizes equal to or smaller than a reference size among a plurality of barcodes in a target image OI may be used for each determination (for example, the determinations of S205, S215, and S235) in the direction determination process of FIG. 8. Alternatively, based on the fact that a barcode having sizes smaller than another reference size is unlikely to cause an importance reading error, only barcodes having sizes equal to or smaller than a reference size among a plurality of barcodes in a target image OI may be used for each determination (for example, the determinations of S205, S215, and S235) in the direction determination process of FIG. 8.

(8) Some of the processes in the printing direction determination process of FIG. 8 in the above-described example may be appropriately omitted. For example, S205 to S230 may be omitted, and a printing direction may be determined through the processes of S235 to S280. In addition, S235 to S265 may be omitted, and a printing direction may be determined through the processes of S205 to S230 and S270 to S280. In addition, S270 and S275 may be omitted, and a printing direction may be determined through the processes of S205 to S265 and S280. In addition, a printing direction may be determined to be a direction determined in advance when S280 is omitted and a printing direction cannot be determined through the processes of S205 to S275.

(9) The printing execution unit in the above-described example is the label printer 100. Alternatively, the printing execution unit may be a printing execution unit of a different type, for example, an inkjet printer or a laser printer.

In the label printer 100 in the above-described example, when a barcode is printed so that the direction of the barcode is parallel with a transport direction, black lines BB and white lines WB of the barcode to be printed are more unlikely to have thicknesses different from a target thickness than a case where a barcode is printed so that the direction of the barcode is perpendicular to a transport direction. However, depending on a printing execution unit, black lines BB and white lines WB of a barcode to be printed may be more unlikely to have thicknesses different from a target thickness when the barcode is printed so that the direction of the barcode is perpendicular to a transport direction than a case where a barcode is printed so that the direction of the barcode is parallel with a transport direction. For example, in a serial type inkjet printer, sub-scanning that transports a sheet in a transport direction and main-scanning that moves a printing head in a main scanning direction are performed. However, it may be preferable that a barcode is printed so that the direction of the barcode is perpendicular to the transport direction, depending on the accuracy of the main scanning and the sub-scanning, and the like. In this case, for example, in S210 of FIG. 8, the CPU 210 may determine a direction perpendicular to the direction of one barcode to be a printing direction. The same is applied to S230, S245, S255, S265, and S275 in FIG. 8. In general, preferably, a printing direction is determined to be a direction based on the direction of one barcode in the target image OI (a direction parallel with the direction of one barcode in the example and a direction perpendicular to the direction of one barcode in the modification example).

(10) In the label printer 100 of the above-described example, the thermal head 162 is fixed, and a sheet for a label is transported. Alternatively, a sheet may be fixed, and a printing execution unit for executing printing by the movement of the thermal head 162 may be used. That is, a printing medium such as a sheet may be moved in a predetermined moving direction relative to a printing head at the time of printing.

(11) The terminal device 200 as an image processing device executing the label printing process of FIG. 3 may be a device of another type, for example, the label printer 100. In this case, for example, the CPU 110 of the label printer 100 executes the label printing process of FIG. 3 by executing the computer program PG1. For example, the CPU 110 generates printing image data by acquiring target image data from the terminal device 200 and executing a label printing process, and outputs the printing image data to the printing mechanism 160. Thus, similarly to the example, a label image is printed by the printing mechanism 160. In this manner, in the above-described example, the terminal device 200 is an example of an image processing device, and the label printer 100 is an example of a printing execution unit. Further, in the present modification example, the CPU 110 of the label printer 100 is an example of an image processing device, and the printing mechanism 160 is an example of a printing execution unit.

In addition, the image processing device executing the label printing process of FIG. 3 may be, for example, a server that acquires target image data from the terminal device 200 or the label printer 100 to execute image processing. Such a server may be a plurality of computers capable of communicating with each other through a network. In this case, all of the plurality of computers capable of communicating with each other through a network are examples of an image processing device.

(12) S45 and S50 of the label printing process of FIG. 3 in the above-described example may be omitted, and a label image may be printed with a predetermined direction (for example, the Y-direction) as a printing direction at all times.

(13) In the above-described examples, some of the components realized by hardware may be replaced with software, and on the contrary, some or all of the components realized by software may be replaced with hardware. For example, some of the processes executed by the CPU 210 of the terminal device 200 of FIG. 1 may be realized by a dedicated hardware circuit.

While the present invention has been described based on the example and the modification example, the above-described embodiment of the invention is to facilitate the understanding of the invention and does not limit the invention. The present invention may be changed and improved without departing from the spirit and the scope of the claims, and the equivalents thereof are included in the present invention.

What is claimed is:

1. An image processing device comprising:
a controller; and
memory storing instructions that, when executed by the controller, cause the controller to perform operations comprising:
acquiring target image data, in which a target image based on the target image data includes a plurality of partial images including a barcode;
specifying the barcode in the target image;
deciding a first direction being a direction perpendicular to bars making at least one specified barcode;
specifying a blank range where the partial image is not positioned in the first direction and an object range where the partial image is positioned in the first direction;
separating the target image to one or more separated target images in accordance with the specified blank range and the specified object range, the separated target image including the object range and excluding the blank range; and
outputting image data corresponding to the separated target images.

2. The image processing device according to claim 1, wherein, in the specifying the barcode, the controller specifies a plurality of barcodes within the target image, wherein, in the deciding, the controller decides a direction perpendicular to one direction as the first direction in case where the number of barcodes made by bars extending in the one direction is larger than the number of barcodes made by bars extending in another direction among the plurality of barcodes.

3. The image processing device according to claim 1, wherein the controller performs operations further comprising:
generating a histogram by classifying a plurality of pixels in the target image into a plurality of classes based on a position in the first direction; and
counting the number of pixels making the partial image with respect to each of the plurality of classes;
wherein, in the specifying, the controller specify the blank range and the object range with respect to a plurality of positions in the first direction by using the histogram.

4. The image processing device according to claim 1, wherein the controller performs operations comprising:
classifying a plurality of pixels in the target image into a plurality of classes based on a position in the first direction; and
counting the number of pixels making the partial image each of classes;
wherein, in the specifying, the controller specifies a range as the blank range of the number of pixels is equal to or less than predetermined threshold value in the first direction, and a range as the object range of the number of pixels is larger than the predetermined threshold value in the first direction.

5. The image processing device according to claim 1, wherein the controller performs operations comprising:
specifying an end range of the separated target image, wherein the end range is a range along a second direction including an end portion in the second direction perpendicular to the first direction and is a range where the partial image is not positioned, and
wherein, in the outputting, the controller outputs the image data corresponding to an image excluding the image within the end range, in the separated target image.

6. The image processing device according to claim 1,
wherein, in the outputting, the controller performs operations:
executing a reduction process for reducing the separated image to have a size corresponding to a printing medium, and
outputting the image data corresponding to the reduced image to a printing execution unit that is configured to print an image on the printing medium.

7. The image processing device according to claim 6, wherein the reduction process is configured to:
reduce, in a case where the barcode is included in the separated image, the barcode in the separated image in accordance with a first reduction method and the partial image excluding the barcode in accordance with a second reduction method, the first reduction method not using an interpolation arithmetic operation, the second reduction method using the interpolation arithmetic operation, and synthesize the reduced barcode and the reduced partial image; and
reduce, in a case where the barcode is not included in the separated image, the separated image in accordance with the second reduction method.

8. The image processing device according to claim 1,
wherein, in the outputting, the controller outputs the image data to a printing execution unit for a label which prints an image on a sheet for a label to be attached to a commodity.

9. The image processing device according to claim 1,
wherein the controller performs operations further comprising:
deciding print directions for each of the image data corresponding to the separated images,
wherein, in the outputting, the controller outputs each of the image data in accordance with each of the decided print directions.

10. The image processing device according to claim 1 further comprising:
a network interface;
wherein, in the outputting, the controller output the image data to a printer via network interface.

11. A non-transitory computer-readable medium having instructions to control an image processing device to perform operations comprising:
acquiring target image data, in which a target image based on the target image data includes a plurality of partial images including a barcode;
specifying the barcode in the target image;
deciding a first direction being a direction perpendicular to bars making at least one specified barcode;
specifying a blank range where the partial image is not positioned in the first direction and an object range where the partial image is positioned in the first direction;
separating the target image to one or more separated target images in accordance with the specified blank range and the specified object range, the separated target image including the object range and excluding the blank range; and
outputting image data corresponding to the separated target images.

12. An image processing method comprising:
acquiring target image data, in which a target image based on the target image data includes a plurality of partial images including a barcode;
specifying the barcode in the target image;
deciding a first direction being a direction perpendicular to bars making at least one specified barcode;
specifying a blank range where the partial image is not positioned in the first direction and an object range where the partial image is positioned in the first direction;
separating the target image to one or more separated target images in accordance with the specified blank range and the specified object range, the separated target image including the object range and excluding the blank range; and
outputting image data, corresponding to the separated target images.

* * * * *

UNITED STATES PATENT AND TRADEMARK OFFICE
CERTIFICATE OF CORRECTION

PATENT NO. : 10,884,737 B2
APPLICATION NO. : 16/391484
DATED : January 5, 2021
INVENTOR(S) : Yoshifumi Kajikawa Page 1 of 1

It is certified that error appears in the above-identified patent and that said Letters Patent is hereby corrected as shown below:

In the Claims

Column 22, Claim 2, Line 29 should read:
a case where the number of barcodes made by bars Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*